2,938,063
STORAGE BATTERY ACTIVE MATERIAL

Reginald H. Greenburg and Raymond B. Callahan, Brooklyn, N.Y., assignors to National Lead Company, New York, N.Y., a corporation of New Jersey No Drawing. Filed Dec. 6, 1957, Ser. No. 700,955

6 Claims. (Cl. 136—26)

This invention relates to the manufacture of lead-acid storage batteries and to a novel positive active material for the plates of such batteries.

Present methods for the manufacture of lead-acid storage batteries comprise pasting a grid structure with a mixture of lead oxide, for example litharge, which may contain metallic lead, red lead and other additives, water and sulfuric acid. The mixture of litharge and acid forms a plastic paste which can be pressed into the interstices of the grid structure and which on drying forms a hard, cohesive, cemented material which is readily retained in the grid. This latter operation is known as pasting and is usually done by mechanical means. This plastic paste condition is the result of the chemical reaction between the litharge and sulfuric acid, whereby a considerable proportion of lead sulfate is formed. Such a paste is characterized by a desirable balance of properties with respect to apparent density, consistency and adhesiveness, all of which are essential to successful grid-pasting operations. For any given oxide, the apparent density (expressed in grams per cubic inch) of the paste is controlled by a proper selection of the ratios of acid and water to oxide. Here again consideration must be given to the paste consistency. If the paste is too stiff or too soft, trouble will be experienced during the pasting operation.

Generally speaking most positive oxides can be formulated into a paste of satisfactory consistency and having an apparent density as low as about 66 grams per cubic inch. Unless the oxide is of less than customary particle size, it is necessary to increase the concentration of water and/or acid in order to bring the apparent density much below 66. Extra water is likely to lower the consistency to below a workable value. Although sulfuric acid usually stiffens the paste, too high a concentration will lead to plates which when cured will be mechanically weak. Frequently the paste material of such plates will spall or separate from the grids during formation.

We have found, that lowering the apparent density of the positive pastes to values below those in current usage is desirable since this leads to proportionally lower active material weights in the pasted plates. At the same time a cell ampere-hour efficiency as determined by the SAE 20 hour test rises considerably with decrease in density. In other words, there is an increase in the number of ampere-hours per ounce of active material per cell. This increase is so large that generally speaking the paste density can be lowered from about 66 grams per cubic inch to one of about 61 grams with practically no loss in 20 hour capacity. At the same time, the SAE cold test capacity (minutes obtained when the battery is discharged at 300 amperes and at 0° F.) increases materially. Better cold test capacities obtain when the positive paste density is lowered from 66 to one of 57 or 58 grams per cubic inch despite a corresponding reduction of about 13% in the weight of active material.

An object of this invention, therefore, is to provide an improved paste composition suitable for the preparation of lead-acid storage battery plates. Another object is to provide an improved positive storage battery plate. A further object is to provide a positive paste composition whose density and consistency can be controlled without adversely affecting the characteristics of the battery plate made therefrom. Still another object is to provide a storage battery plate characterized by a more improved efficiency in the utilization of the active material therein. Other objects and advantages will become apparent from the following more complete description and claims.

Broadly, this invention contemplates a composition adapted to be mixed with water to form a paste suitable for incorporation into positive lead-acid storage battery plates as active material therein, comprising lead oxide, a metallic sulfate selected from the group consisting of aluminum sulfate, magnesium sulfate and mixtures thereof in amount from 0.1 to 7 parts by weight, calculated as aluminum sulfate octadecahydrate, $Al_2(SO_4)_3 \cdot 18H_2O$ and magnesium sulfate heptahydrate, $MgSO_4 \cdot 7H_2O$, respectively, for each 100 parts of lead oxide, and a sulfate selected from the group consisting of sulfuric acid, lead sulfate and basic lead sulfate in amount equivalent to between 2.5 and 6.5 parts of $SO_3$ for each 100 parts of lead oxide.

This invention also contemplates a paste composition suitable for use in positive lead-acid storage battery plates as active material therein, comprising lead oxide, a metallic sulfate selected from the group consisting of aluminum sulfate, magnesium sulfate and mixtures thereof in amount from 0.1 to 7 parts by weight, calculated as aluminum sulfate octadecahydrate, $Al_2(SO_4)_3 \cdot 18H_2O$ and magnesium sulfate heptahydrate, $MgSO_4 \cdot 7H_2O$, respectively, for each 100 parts of lead oxide, a sulfate selected from the group consisting of sulfuric acid, lead sulfate and basic lead sulfate in amount equivalent to between 2.5 and 6.5 parts of $SO_3$ for each 100 parts of lead oxide, and water in amount sufficient to impart to said paste composition a density of less than 65 grams per cubic inch.

It has been found that when aluminum sulfate or magnesium sulfate, or a mixture thereof is incorporated in the active material paste in the amounts above specified, several surprising beneficial results are obtained. The properties of the paste composition are improved in that the aluminum or magnesium sulfate exerts a stiffening action, necessitating additional water in order to obtain a paste of workable consistency. The additional water, in turn, lowers the apparent density of the paste. The reason for this stiffening action is not fully established, but it has been found that the optimum paste consistency for grid-pasting operations is achieved consistently at lower paste densities when aluminum or magnesium sulfate is used than when it is absent. The lower density is not due merely to the fact that aluminum and magnesium sulfates are lighter, bulkier materials than lead sulfate, thereby reducing the density of the mixture by a dilution effect. The lower paste density is achieved without a proportionate increase in the volume of solids in the paste.

Positive plates made from pastes diluted with the additional water are more porous and permeable than those made without the aluminum or magnesium sulfate. Consequently, there are provided more pores within the active material, enabling the free permeation of electrolyte, which results, in turn, in higher available discharge capacities and more efficient utilization of the metal values in the active material. Moreover, this reduction in plate density and increase in efficiency is achieved without any appreciable loss of strength or coherence in the plate. Battery plates made according to this invention, therefore, can be made lighter and cheaper without sacrificing capacity, or alternatively, may be made with increased capacity at the same cost and weight as conventional lead-acid storage batteries.

The amount of aluminum sulfate, magnesium sulfate, or combination of the two may be varied to some extent. In general, however, it is desirable to employ at least 0.2 part by weight of the aluminum or magnesium sulfate for each 100 parts of lead oxide in order to achieve the full benefits of the invention. Smaller amounts may of course be used if desired, but with correspondingly reduced effect. On the other hand, it is not usually desirable to employ more than about 5 parts of aluminum or magnesium sulfate for each 100 parts of lead oxide, for two reasons: For one thing, higher amounts fail to contribute proportionate increases in consistency. Also, higher amounts tend to dilute the active material unduly, so that they increase, rather than decrease, the total weight of paste required to achieve a given capacity.

Additional sulfate values are needed, over and above the sulfate values associated with the aluminum and/or magnesium sulfate, because the capacity of the resulting plates is adversely affected in their absence. These additional sulfates may be supplied in any convenient form which will result in the presence or formation of lead sulfate, while avoiding the introduction of undesirable by-products into the paste composition. As a practical matter, it is most convenient to introduce these additional sulfates either as lead sulfate or a basic lead sulfate directly, or as sulfuric acid (conveniently introduced by dissolving it in part of the water used for making the paste). These additional sulfate values should be present in amount equivalent to between 2.5 and 6.5 parts of $SO_3$ for each 100 parts of lead oxide. When the additional sulfate is added in the form of lead sulfate, the "lead oxide" should be taken to include the lead oxide equivalent of the lead in the lead sulfate itself. Higher amounts of these additional sulfate values should be avoided because of trouble in curing the plates, mechanical weakness of said plates and formation difficulties while lower amounts are undesirable because of an impaired 20 hour capacity.

The reasons for the impaired 20 hour capacity in the absence of sufficient sulfate values are not fully understood. However, it has been established that for a given paste density, formed and uncycled plates made from a paste having no added lead sulfate or sulfuric acid have a very much lower concentration of lead dioxide than do plates made from a paste containing one or the other of these added compounds. It is believed that the lead sulfate-containing plates have what amounts to sulfuric acid in situ that as this acid is released during formation, unformed particles in the immediate vicinity are in turn sulfated, liberating acid once again as they are oxidized. As a result, it appears that more particles are sulfated during formation than is the case when there is no combined acid in the paste and that it is these sulfated particles which are more readily oxidized to $PbO_2$.

In order to illustrate more fully the nature of this invention and the manner of practising the same, the following examples are presented:

*Examples*

Five dry blends were prepared from an uncalcined litharge containing approximately 25% free lead metal (Pb) and 75% PbO. One blend contained no added salt and acted as a control. Other blends contained 0.5% and 1% respectively of hydrated aluminum sulfate, i.e., $Al_2(SO_4)_3 \cdot 18H_2O$. The two remaining blends contained 0.5% and 1% respectively of hydrated magnesium sulfate, i.e., $MgSO_4 \cdot 7H_2O$.

The blends were mixed for about 4 minutes in a pony mixer in the presence of water concentrations shown in the table below for about 4 minutes. Following this 40 ml. of 1.4 sp. gr. sulfuric acid per pound of dry blend were added to each mix over a period of about 10 minutes. The mixing was continued until the paste temperature had come down to about 105° F. The resulting paste densities are shown in the table below.

Positive plates were pasted and cured under identical conditions. They were assembled into groups and dovetailed with separators and substantially identical negative plates prepared from one paste batch. Formations and other processing steps were carried out in accordance with conventional methods. The assembled 15 plate cells were tested for capacity according to the methods specified by the Society of Automotive Engineers. In the following table alum. salt refers to $Al_2(SO_4)_3 \cdot 18H_2O$ and mag. salt refers to $MgSO_4 \cdot 7H_2O$.

| Agent and Percent | Mix Water, ml./lb. of Blend | Paste Density, Gms./In.³ | Oz. Dry Paste per Cell | 20 Hr. Capacity, Amp.-Hrs. | Amp.-Hrs. per Oz. Dry Paste | Cold Test Capacity, Minutes |
|---|---|---|---|---|---|---|
| none | 60 | 66.0 | 28.04 | 94.5 | 3.37 | 3.85 |
| 0.5% alum. salt | 63 | 63.0 | 26.60 | 94.8 | 3.55 | 4.30 |
| 1.0% alum. salt | 70 | 61.5 | 26.30 | 97.3 | 3.71 | 3.97 |
| 0.5% mag. salt | 66 | 62.5 | 27.16 | 96.0 | 3.53 | 4.31 |
| 1.0% mag. salt | 70 | 61.0 | 25.69 | 93.2 | 3.62 | 4.20 |

In another example a blend was made using 0.65 part of the aluminum salt, 0.20 part of cellulose floc, 8 parts of 95% red lead and 91.55 parts of the uncalcined oxide. This was made into a paste as described above using 81 ml. of water and 40 ml. of 1.4 sp. gr. acid per pound of blend. Cells were processed and tested as above. The paste density was 59 grams per cubic inch and there were 22.75 oz. of dry positive paste per cell. The 20 hour capacity was 92.2 ampere-hours which is equivalent to 4.06 ampere-hours/ounce of dry paste/cell. The cold test capacity was 4.62 minutes.

The above results show that the positive blends according to this invention lead to a marked increase in efficiency on the 20 hour test despite the decrease in amount of active material there was a significant increase in cold test capacity.

While this invention has been described with reference to certain preferred embodiments and illustrated by means of specific examples, these are illustrative only, and the invention is not to be construed as limited except as set forth in the appended claims.

We claim:
1. A composition adapted to be mixed with water to form a paste suitable for incorporation into positive lead-acid storage battery plates as active material therein, comprising lead oxide, a metallic sulfate selected from the group consisting of aluminum sulfate, magnesium sulfate and mixtures thereof in amount from 0.2 to 5 parts by weight, calculated as aluminum sulfate octadecahydrate, $Al_2(SO_4)_3 \cdot 18H_2O$ and magnesium sulfate heptahydrate, $MgSO_4 \cdot 7H_2O$, respectively, for each 100 parts of lead oxide, and a sulfate selected from the group consisting of sulfuric acid, lead sulfate and basic lead sulfate in amount equivalent to between 2.5 and 6.5 parts of $SO_3$ for each 100 parts of lead oxide.

2. A composition according to claim 1, wherein said metallic sulfate is aluminum sulfate.

3. A composition according to claim 1, wherein said metallic sulfate is magnesium sulfate.

4. A paste composition suitable for use in positive lead-acid storage battery plates as active material therein, comprising lead oxide, a metallic sulfate selected from the group consisting of aluminum sulfate, magnesium sulfate and mixtures thereof in amount from 0.2 to 5 parts by weight, calculated as aluminum sulfate octadecahydrate, $Al_2(SO_4)_3 \cdot 18H_2O$ and magnesium sulfate heptahydrate, $MgSO_4 \cdot 7H_2O$, respectively, for each 100 parts of lead oxide, a sulfate selected from the group consisting of sulfuric acid, lead sulfate and basic lead sulfate in amount equivalent to between 2.5 and 6.5 parts of $SO_3$ for each 100 parts of lead oxide, and water in amount sufficient to impart to said paste composition a density of less than 65 grams per cubic inch.

5. A paste composition according to claim 4, wherein said metallic sulfate is aluminum sulfate.

6. A paste composition according to claim 4, wherein said metallic sulfate is magnesium sulfate.

References Cited in the file of this patent

UNITED STATES PATENTS

| | | |
|---|---|---|
| 1,215,907 | Carpenter | Feb. 13, 1917 |
| 1,306,214 | Crowley | June 10, 1919 |
| 2,555,301 | Chubb | June 5, 1951 |